Feb. 12, 1929.
1,701,980
J. M. LUERS
TOOL HOLDER AND BLADE THEREFOR
Filed June 7, 1926
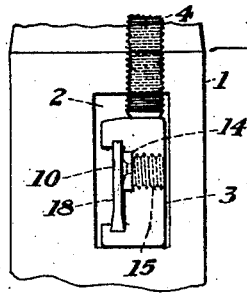
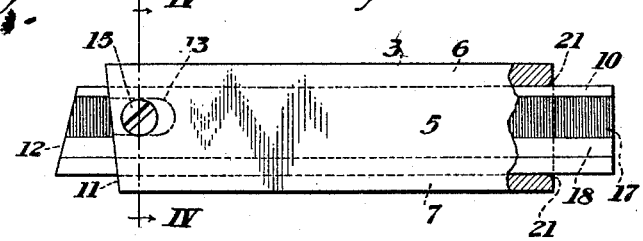
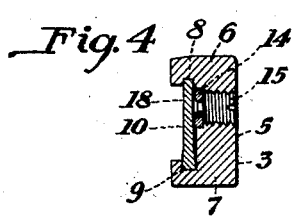
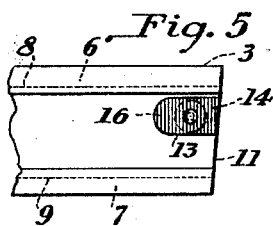
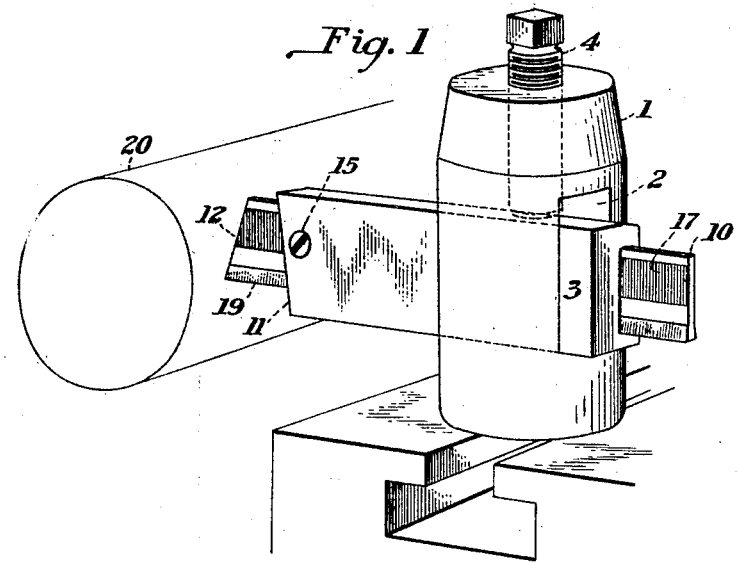
INVENTOR.
John Milton Luers
BY
ATTORNEY.

Patented Feb. 12, 1929.

1,701,980

UNITED STATES PATENT OFFICE.

JOHN MILTON LUERS, OF DETROIT, MICHIGAN.

TOOL HOLDER AND BLADE THEREFOR.

Application filed June 7, 1926. Serial No. 114,047.

This invention relates to improvements in tool-holders and blades therefor, and refers more particularly to parting tools and their holders.

Considerable delay is usually caused each time a tool is re-set after having been removed for grinding or any other purpose, and moreover to re-set a tool, particularly when working between close limits, requires the services of a skilled mechanic.

It is an object of this invention to provide a toolholder so constructed that the blade may be removed and replaced by an unskilled operator with the assurance that when replaced the blade will be in exactly the same position as it was before. So that considerable time may be saved and the services of a high priced mechanic eliminated.

A second object of the invention is to provide a compact form of toolholder which need only extend a very short distance in front of the tool post to allow the blade to be removed and replaced without disturbing the holder; and again the blade is so made that though there is ample stock for repeated grinding only a comparatively small amount of steel is required therefor.

Another object of the invention is to provide a tool-holder having longitudinal grooves to receive the blade, and having its upper surface so shaped that pressure exerted thereon by set screws or other holding means will not distort the holder and cause the blade to bind in the groove so that it cannot be easily removed.

A further object of the invention is to provide a simply constructed toolholder and blade that will accomplish the above mentioned and other objects, and which can be produced and sold at comparatively small cost.

Having thus briefly outlined the major objects of the invention I will now proceed to described an embodiment thereof with the aid of the accompanying drawings:

Figure 1 illustrates a perspective view of the toolholder in position in a tool post, and a blade in the holder.

Figure 2 shows a front elevation of the tool post with the toolholder and blade therein.

Figure 3 is a side view of the toolholder and the ends of the blade.

Figure 4 is a section on the line IV—IV of Figure 3, and

Figure 5 is a partial view of the holder.

Referring now to the drawing, 1 designates a known type of tool post provided with a horizontal opening therethrough to receive the toolholder 3, which latter is held in position by a set screw 4. The holder 3 consists of a vertical wall 5 having horizontal projections 6 and 7 at its upper and lower ends respectively on one and the same side. These projections extend towards one another at their outer ends to form upper and lower receiving grooves 8 and 9 for the blade 10. One end of the holder is also tapered at 11 in the reverse direction to the clearance taper 12 on the blade, so that the latter may make deeper cuts with less overhang. 20 indicates a piece of stock to be cut.

A slot 13 extends inwards from the end 11 of the holder to receive the insert 14. The latter is held in position in the slot by a grub screw 15 which is in threaded engagement with the wall 5, and is also riveted over the outer side of the insert through which it passes. The insert has vertical serrations 16 on its outer side which coact with complementary serrations 17 on one side of the blade. When the grub screw 15 is tightened the insert forces the blade laterally against the outer surfaces of the grooves 8 and 9, and the serrated surfaces cooperate to hold the blade firmly in position.

It will be noted that the upper and lower grooves 8 and 9 are of different widths, and that the sides 18 of the blade are backed off from the cutting edge 19. This decreases the amount of bearing surface in the holder against which the blade rests and consequently lessens the frictional resistance when inserting or removing the tool. The ends of the projections 6 and 7 remote from the tapered end 11 of the toolholder are preferably chamfered at 21 to facilitate the insertion of the blade into the receiving grooves.

The upper surface of the holder is flat for portion of its width, and is downwardly inclined over the receiving groove 8. This is done to reduce the possibility of the set screw 4 in the tool post forcing the upper projection 6 inwards and thereby distorting the holder.

From the foregoing it will be clearly seen that the length of the bearing surfaces in the toolholder is such that there is practically no possibility of the position of the tool varying however often it is removed and replaced so long as the holder remains fixed in the tool post. Moreover it is understood that the construction herein described is susceptible to such modifications as fall within the scope of the appended claims.

What I claim as my invention and desire to secure by Letters Patent is:

1. In a tool of the character described, the combination of a tool holder consisting of an elongated body having opposed blade receiving grooves formed in portions projecting from one side face thereof, a blade slidable longitudinally in said grooves, and means engaged with the body and adapted to exert pressure on the blade in a direction transverse to its length to hold it immovable in said grooves, all parts of said securing means lying within the planes of the faces of the body.

2. In a tool of the character described, the combination of a tool holder consisting of an elongated body having opposed blade receiving grooves formed in portions projecting from one side face thereof, a blade slidable longitudinally in said grooves, a recess being formed in the face of the body from which the grooved portions project and between said grooves, a plate within said recess having its outer face roughened, and means engaged with the body for adjusting said plate bodily toward and from the adjacent face of the blade, whereby the latter may be forced into close contact with the outer walls of the grooves in which it is positioned and held immovable in the holder.

3. In a tool of the character described, the combination of a tool holder consisting of an elongated body having opposed blade receiving grooves formed in portions projecting from one side face thereof and extending substantially throughout its length, a blade having its edges within said grooves and adapted to slide longitudinally therein, a recess being formed in the face of the body from which the grooved portions project and between said grooves, a plate within said recess having its outer face roughened, and a screw engaged with the body of the holder and bearing against said blade to force the roughened face thereof into close contact with the blade and to hold the latter immovable in the holder, the outer end of the screw when in operative position being substantially flush with the adjacent surface of the body of the holder.

4. In a tool of the character described, the combination of a tool holder consisting of an elongated body having opposed blade receiving grooves formed in portions projecting from one side face thereof, a blade slidable longitudinally in said grooves and having a plurality of transversely extending serrations on its inner face, a recess being formed in the outer face of the body from which the grooved portions project and over which the blade extends, a plate within said recess having its outer face roughened to engage the serrations on the blade, and a screw engaged with the body of the holder and adapted to move the plate transversely of the holder to retain the blade in position therein.

JOHN MILTON LUERS.